United States Patent
Greef et al.

(10) Patent No.: US 7,877,417 B2
(45) Date of Patent: Jan. 25, 2011

(54) METHOD AND APPARATUS FOR EXCHANGING DATA WITH A DATABASE

(75) Inventors: Arthur R. Greef, Rungsted Kyst (DK); Arne Kroka, Kokkedal (DK); Niels E. Møller, København (DK); Per Baarsøe Jorgensen, Landsby (DK); Søren V. Andersen, Birkerød (DK)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 11/100,286

(22) Filed: Apr. 6, 2005

(65) Prior Publication Data

US 2006/0230075 A1    Oct. 12, 2006

(51) Int. Cl.
  *G06F 7/00*   (2006.01)
  *G06F 17/30*  (2006.01)
  *G06F 17/00*  (2006.01)
(52) U.S. Cl. .................. 707/803; 707/694; 707/806
(58) Field of Classification Search .............. 707/803, 707/804, 806, 694
   See application file for complete search history.

(56) References Cited

U.S. PATENT DOCUMENTS

| 6,631,519 B1 * | 10/2003 | Nicholson et al. ........... 717/169 |
| 6,832,219 B2 * | 12/2004 | Lal ............................... 707/3 |
| 2004/0064826 A1 * | 4/2004 | Lim et al. .................... 719/319 |

* cited by examiner

*Primary Examiner*—Khanh B Pham
*Assistant Examiner*—Ann J Chempakaseril
(74) *Attorney, Agent, or Firm*—Marshall, Gerstein & Borun LLP

(57) ABSTRACT

A data exchange system for communicating with a database having a plurality of data tables includes a plurality of internal classes adapted to represent data from the data tables in a business entity format, a plurality of query structures corresponding to the plurality of data tables and a plurality of document classes referencing one or more of the plurality of query structures. The data exchange system allows an application to communicate with the database without having to know the structure of the database. Moreover the data exchange system allows the database to communicate with a document without having to know any business logic governing the creation, retrieval, update, deletion, etc., of the document.

2 Claims, 8 Drawing Sheets

```xml
<?xml version="1.0" encoding="utf-8" ?>
<PurchaseOrder xmlns="http://schemas.microsoft.com/axapta/gateway">
   <Properties>
        <companyId>4001</companyId>
        <docPurpose>Original</docPurpose>
   </Properties>

<VendPurchOrderJour>
        <Properties>
         <purchOrderDate>25/10/2004</purchOrderDate>
         <purchId>00147_101</purchId>
         ...
        </Properties>

<VendPurchOrderTrans>
          <Properties>
            <itemId>Chair#1</itemId>
            <qty>47</qty>
            ...
          </Properties>
          <InventDim>
            <Properties>
              ...
            </Properties>
          </InventDim>
               <InventReportDimHistory>
               <Properties>
                 ...
               </Properties>
             </InventReportDimHistory>
             <DocuRef>
                <Properties>
                  <Notes>Only available in red</Notes>
                </Properties>
             </DocuRef>
        </VendPurchOrderTrans>

<VendPurchOrderTrans>
          <Properties>
            <itemId>RoundTable</itemId>
                <qty>3</qty>
                ...
          </Properties>
          <InventDim>
             <Properties>
               ...
             </Properties>
          </InventDim>
          <InventReportDimHistory>
             <Properties>
               ...
             </Properties>
          </InventReportDimHistory>
          <DocuRef>
             <Properties>
               <Notes>Only available in red</Notes>
             </Properties>
          </DocuRef>
        </VendPurchOrderTrans>
     </VendPurchOrderJour>

<companyInfo>
         <Properties>
           ...
         </Properties>
     </companyInfo>
</PurchaseOrder>
```

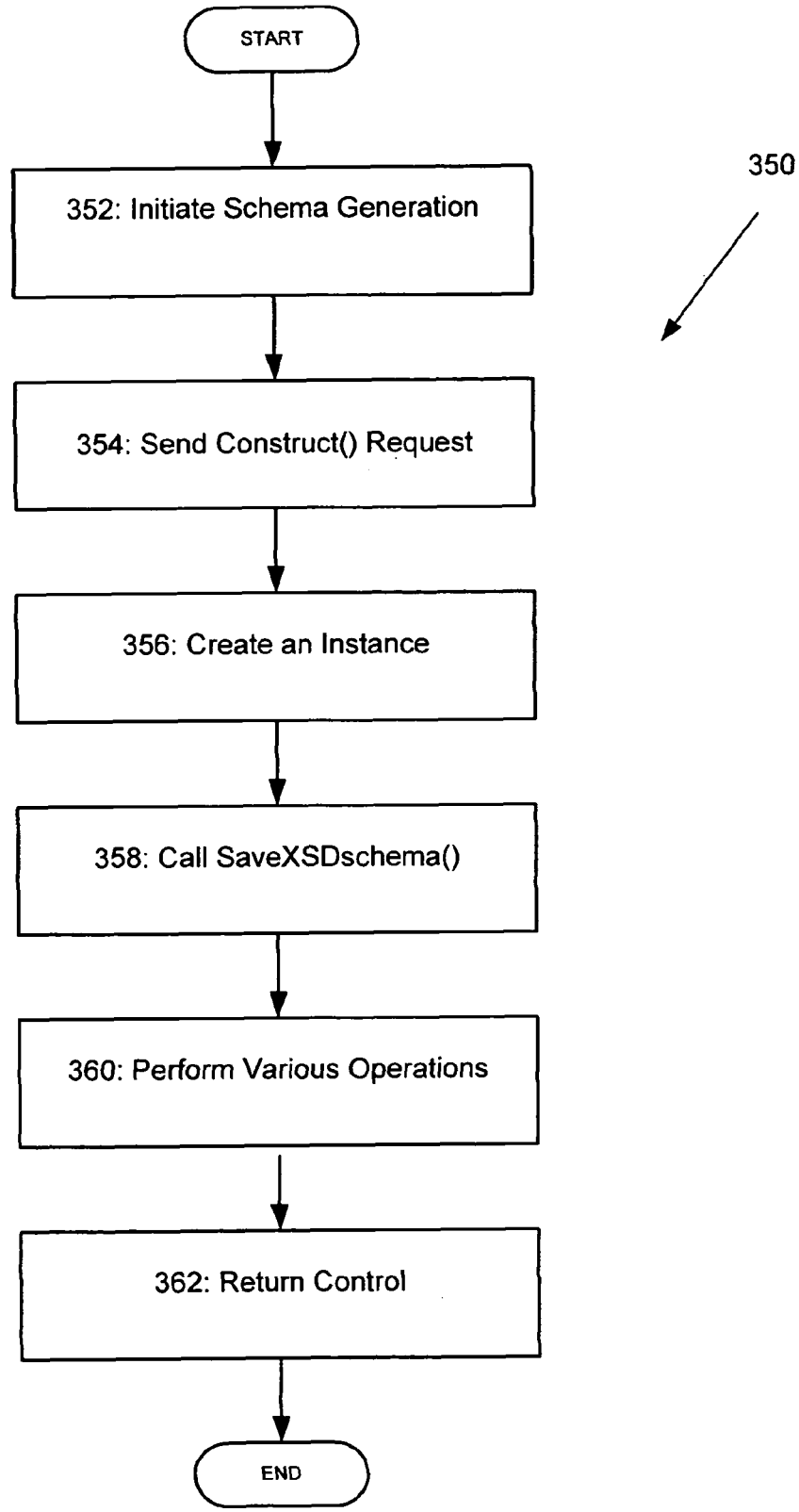

METHOD AND APPARATUS FOR EXCHANGING DATA WITH A DATABASE

TECHNICAL FIELD

This patent relates generally to computer software and more particularly to business application software using the Internet.

BACKGROUND

Modern day businesses cannot function efficiently without use of state of the art technology. Specifically, computers and software are an almost essential part of most of the businesses in developed economies. Typically, businesses use a number of software applications to manage various data related to their businesses and clients. Such data is generally stored in databases such as, a relational database and queried and manipulated using a structured query language (SQL), etc. With the proliferation and wide spread use of business computer applications, intranets, the Internet, and corporate networks, businesses often have the need to update information stored in various databases and to provide such information to users and applications over the corporate networks, Intranets and the Internet.

Over the past decade, the World Wide Web (web) has become an extremely popular vehicle for information exchange and electronic commerce over the Internet. The web uses various markup languages such as hypertext markup language (HTML), extensible markup language (XML), etc., to communicate information over the Internet. Among these languages, the XML has become the de-facto metadata language for describing application components such as forms, flows, data, and the like. XML is a simple, very flexible text format derived from standard generalized markup language (SGML) protocol. Originally designed to meet the challenges of large-scale electronic publishing, XML is also playing an especially important role in the exchange of a wide variety of data on the web and elsewhere.

Database applications such as Microsoft® Axapta®, Navision®, Great Plains® Enterprise Resource Planning (ERP) application, etc., generally have architectures that are highly tuned for processing database transactions, such as data read, data write, etc. However, such architectures are often cumbersome or narrowly designed for processing XML documents. On the other hand, XML documents have become the preferred method for exchanging data between database applications and various enterprise applications, such as customer relation management (CRM) applications, human resources applications, accounting applications, etc. It may be difficult to design an XML data exchange system for database applications as the database applications are typically built on top of a relational data model and usually their relational data schema is hard to be aligned with that of a hierarchical XML document model.

As a result, XML documents residing outside a database system is often misaligned with the data and the programming objects of the database system. Working with data, objects and XML documents is often difficult when the XML tags, program classes and methods do not share the same syntax and semantics as that of the fields used in the database tables. As a result, to efficiently share data between a database and an XML document, one may have to map the data to objects and objects to XML documents. This mapping process can be extremely tedious and error prone manual process that may require a number of specialized tools.

One solution to solving this problem may be to use a typed dataset, wherein the typed dataset can be automatically generated from an XML schema. Generating a typed dataset from an XML schema provides an object programming interface to a relational data structure that can be serialized as an XML document and de-serialized from an XML document. Unfortunately, this approach of generating a typed dataset is not widely used when a database schema already exists. Moreover, it is more natural for application developers to create SQL database queries and to automatically generate XML schema than to create XML schema and then to automatically generate a database schema. While a query provides both a data structure and a database storage/retrieval strategy, an XML schema simply provides only a data structure.

SUMMARY

A data exchange system for communicating with a database having a plurality of data tables includes a plurality of internal classes adapted to represent data from the data tables in a business entity format, a plurality of query structures corresponding to the plurality of data tables and a plurality of document classes referencing one or more of the plurality of query structures. The data exchange system allows an application to communicate with the database without having to know the structure of the database. Moreover the data exchange system allows the database to communicate with a document without having to know any business logic governing the creation, retrieval, update, deletion, etc., of the document.

An embodiment of the data exchange system allows the database to communicate with an XML document without having to know any business logic governing the creation, retrieval, update, deletion, etc., of the XML document. An alternate implementation of the data exchange system allows an XML document schema to be generated from an SQL query structure defining structure of a document. A yet another embodiment of the data exchange system allows an XML schema for a document to be generated based on a typed data source defining the document.

A yet another embodiment of the data exchange system allows exchanging data between a database table and an application, wherein the system includes an internal class adapted to represent the data from the database table in a business entity format, a document class adapted to represent an XML document, a query structure adapted to a data storage/data retrieval strategy, a serialization module adapted to serialize the XML document to the database table and a de-serialization module adapted to de-serialize the data to the XML document.

BRIEF DESCRIPTION OF DRAWINGS

FIG. 4B represents an exemplary XML schema generated using the query structure of FIG. 4A;

FIG. 7 illustrates an exemplary flowchart illustrating generating an XML schema based on a typed data source defining a document.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Network

Figure 1:
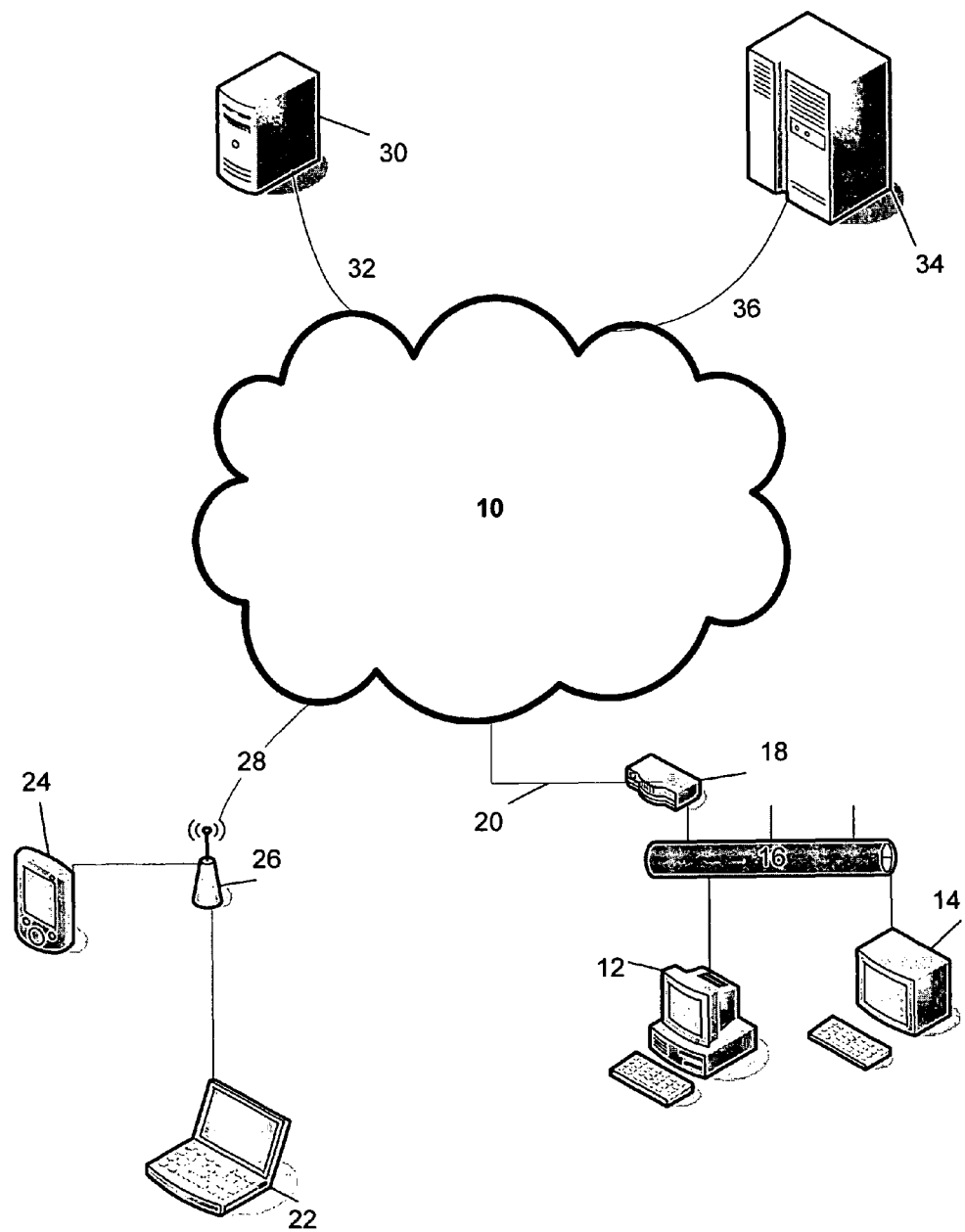
FIG. 1 is a block diagram of a network interconnecting a plurality of computing resources.

FIG. 1 illustrates a network 10 that may be used to implement a data exchange system described herein. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the dynamic software provisioning system may be stored and operated on any of the various devices connected to the network 10.

Computer

Figure 2:
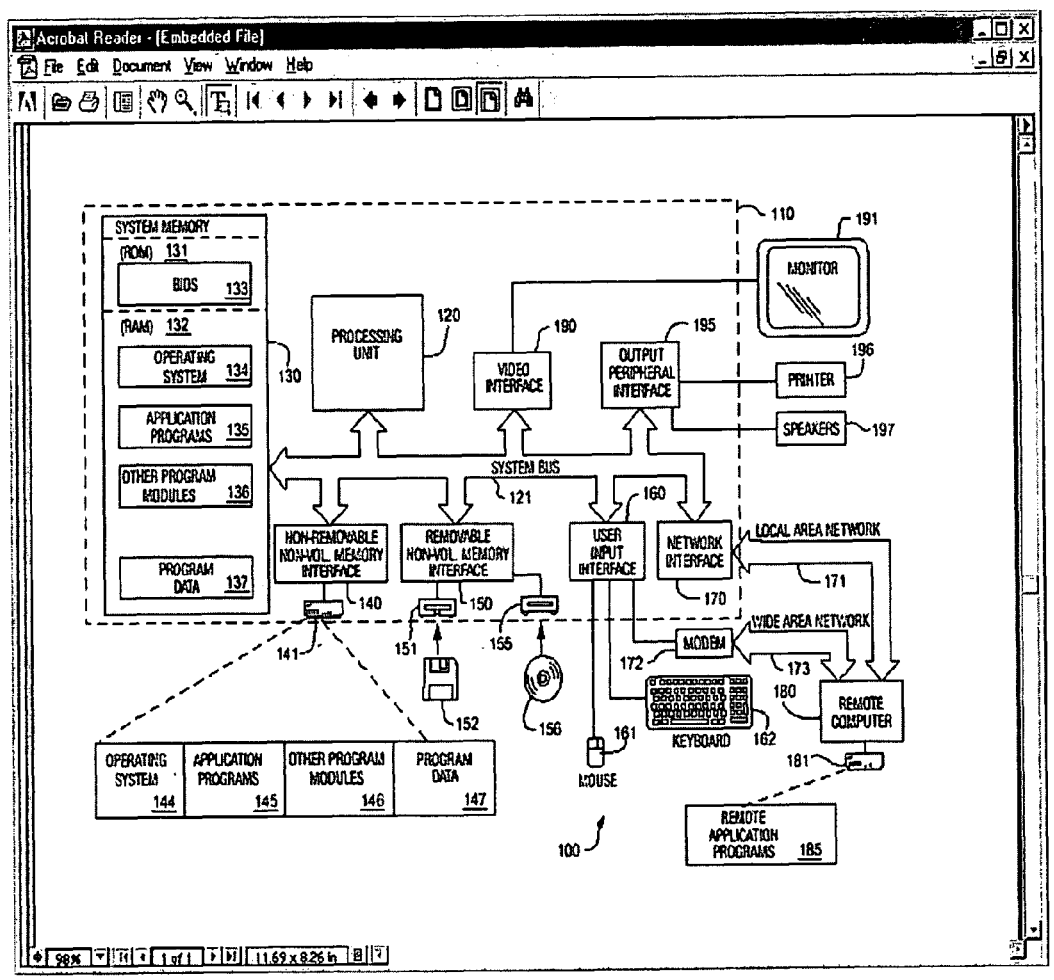
FIG. 2 is a block diagram of a computer that may be connected to the network of FIG. 1.

FIG. 2 illustrates a computing device 100 in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Data Exchange System

Figure 3:
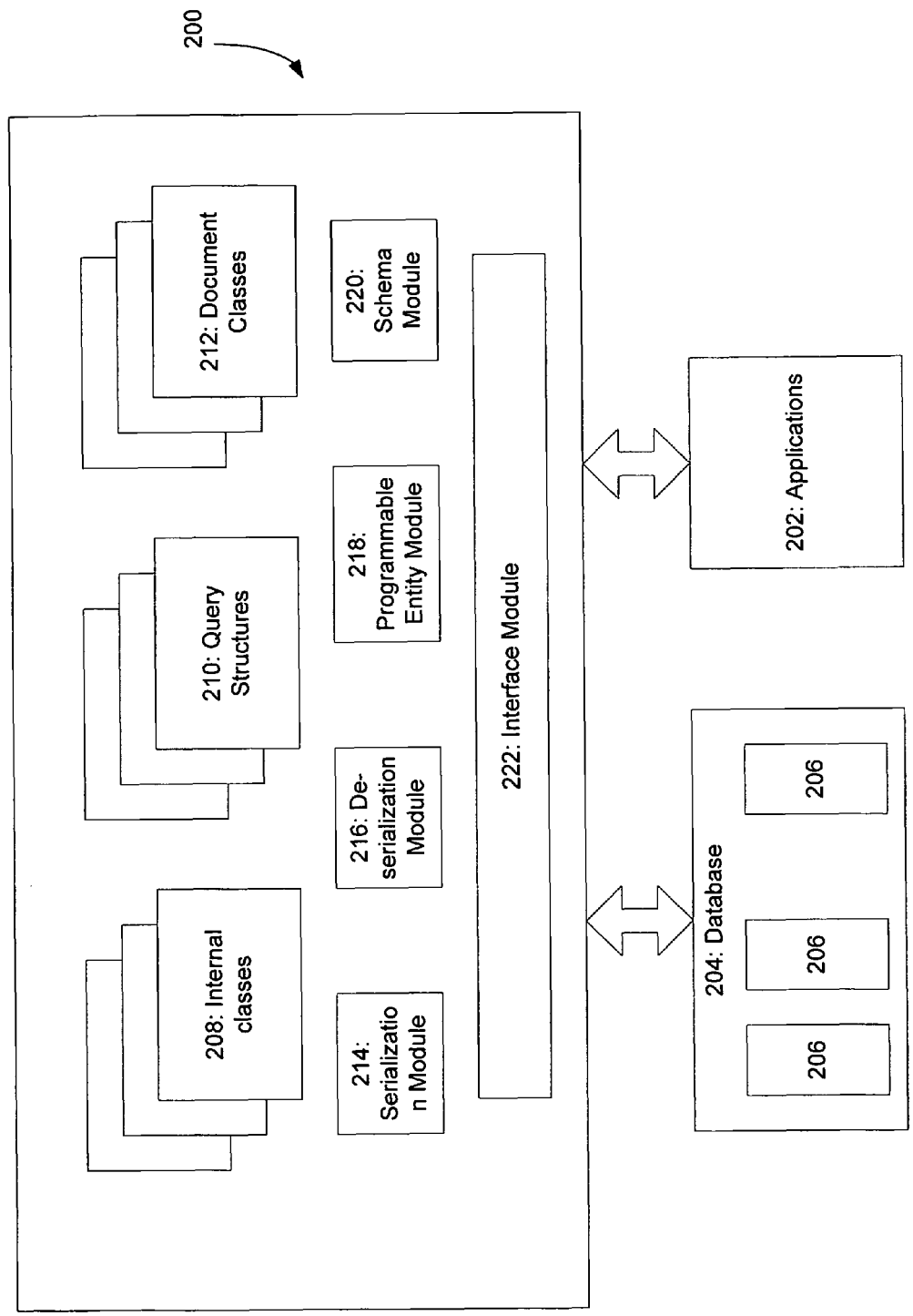
FIG. 3 illustrates a schematic diagram of an implementation of a data exchange system that allows an application to exchange XML data with a database.

FIG. 3 illustrates a schematic diagram of a data exchange system 200 which allows a number of applications 202 to communicate with a database 204. The database 204 may include a number of data tables 206 containing various information used by one or more of the applications 202. The data exchange system 200 allows an application to communicate with the database 204 without having to know the structure of the various tables 206, their logical relationships, etc.

Moreover the data exchange system 200 may also allow the application 202 to communicate with the database 204 without having to know any business logic governing the creation, retrieval, update, deletion, etc., of data within the database 204. Thus, using the data exchange system 200, an application 202 can extract data from the tables 206 and receive data output in the form of an XML document. On the other hand, the application 202 may also supply data to the data exchange system 200 in form of an XML document and the data exchange system 200 may map the data from such an XML document to the tables 206. Note that while this implementation of the data exchange system 200 is illustrated to map data to and from an XML document, an alternate implementation of the data exchange system 200 may be designed to map to and from another types of documents, including documents created using another markup language.

The data exchange system 200 may be implemented on a computer, such as the computer 110. Alternatively, various components of the data exchange system 200 may be implemented on various separate computers/servers connected by a network such as the network 10. Moreover, each of the data exchange system 200, the application 202 and the database 204 may be located on various nodes of the network 10, such as the Internet.

The data exchange system 200 may include a plurality of internal classes 208 adapted to represent data from the data tables 206 in a business entity format. For each of the various data tables 206, the data exchange system 200 may include an internal class. For example, if the database 204 stores data for a business application where one of the data tables 206 is a PurchTable, the data exchange system 200 may include an internal class PurchTable, representing the table PurchTable. Providing internal classes 208 allows a calling application, such as the application 202, to exchange a document with the data exchange system 200 without having to access the underlying data tables 206.

One of the various purposes of the internal classes 208 may be to hide any business logic associated with the creation and modification of records in the associated data tables 206. Thus, for example the internal classes may be responsible for various functions required by the structure of the data tables 206, including: (1) defaulting or generating default values for data table fields not explicitly set by the calling application; (2) sequencing or setting data table fields in the right order to prevent explicitly set values within the data tables to be overwritten by the defaulting logic; (3) validating or maintaining referential integrity in the data tables 206 and ensuring that any field/record level rules are honored; and (4) error processing or consolidating error messages when applying operations across fields of the data tables 206 so that the calling application gets a list of all errors.

Various characteristics of the internal classes 208 may include a one to one relationship between each of the internal classes 208 with one of the data tables 206, an ability to manipulate data table records directly, and an ability to read and write to the data tables without violating any business logic associated with the data tables. Generally, internal classes 208 may be self-contained in that the operations of the internal classes 208 are independent of the context of the calls received from the calling operations.

The data exchange system 200 may also include a plurality of query structures 210 corresponding to the plurality of data tables 206 and therefore also corresponding to the plurality of similarly named internal classes 208. Each of the plurality of query structures 210 may be defined using a well known query language, such as the SQL, etc. Moreover, the data exchange system 200 may also include a plurality of document classes 212 each of which may reference one of the plurality of query structures 210. The document classes 212 may provide an external interface to the database 204. Specifically, the internal classes 208, the query structures 210 and the document classes 212 may encapsulate various data from the database 204 to represent the relational data from the database 204 as objects. Such objects may also include any business logic that applies across various data tables 206 and it may ensure that any business rule governing lifecycle of a document is observed by the data exchange system 200.

The document classes 212 may be designed with the knowledge of the various documents processed by the data exchange system 200. For example, the document class for a PurchaseOrder may be designed with the knowledge regarding the data tables related to the PurchaseOrder (where such knowledge is captured in a corresponding query structure among the query structures 210), business logic related to the PurchaseOrder, lifecycle of the PurchaseOrder, etc. The document classes 212 may perform a retrieve operation using the corresponding query structures 210 for such documents in a manner so that all elements related to such a document are retrieved in a single operation and all the elements are serialized in a single operation to an XML file. To achieve this, the data exchange system 200 may also include a serialization module 214 operating with the internal classes 208, the query structures 210 and the document classes 212, where such a serialization module 214 allows data from the data tables 206 to be serialized into an XML document that can be used by an application 202. Furthermore, the document classes 212 may perform a save operation to save data from an XML document to be saved to the data tables 206 in a single operation. To achieve this, the data exchange system 200 may also include a de-serialization module 216 operating with the internal classes 208, the query structures 210 and the document classes 212.

The document classes 212 may also be designed to observe any lifecycle rule associated with the documents generated by the data exchange system 200. Thus, for example, an order change request may be accepted only if a corresponding order has not already been shipped, etc. The document classes 212 may also be designed to observe any business logic associated with a document, to provide information pertaining to specific instances of various documents and to provide consolidated view of all the errors related to a document.

Each of the various document classes 212 may have a one to one relationship with a corresponding document of the data exchange system 200. If one of the document classes 212 supports both a document inbound to the data exchange system 200 and a document outbound from the data exchange system 200, such a document class generally reads data from the same data tables 206 as it writes to. The document classes 212 may be designed in a manner so that they manipulate data in the data tables 206 indirectly through the internal classes 208 and the query structures 210. Moreover, each of the document classes 212 may provide access to all public properties of the corresponding internal classes 208 that are aggregated by that particular document class using the corresponding query structures 210. The internal classes 208, the query structures 210 the document classes 212 are also collectively known as typed data sources.

The document classes 212 may be designed to work with the query structures 210 that represent the structure of an inbound or an outbound document. Generally, such a query describing the structure of a document may be defined using various data tables 206. The document classes 212 may also be designed to generate a schema for an XML document used by the data exchange system 200. Specifically, the document classes 212 may use an SQL query structure from the query structures 210 and a schema module 220 that allows a user to define an SQL query on the data tables 206, where such an SQL query may define a data storage/retrieval strategy and to generate an XML schema based on the SQL query. The document classes 212 may use such an SQL query and generate an XML schema by iterating through such an SQL query and the fields of the data tables 206 that are prescribed by such an SQL query.

Figure 4A:
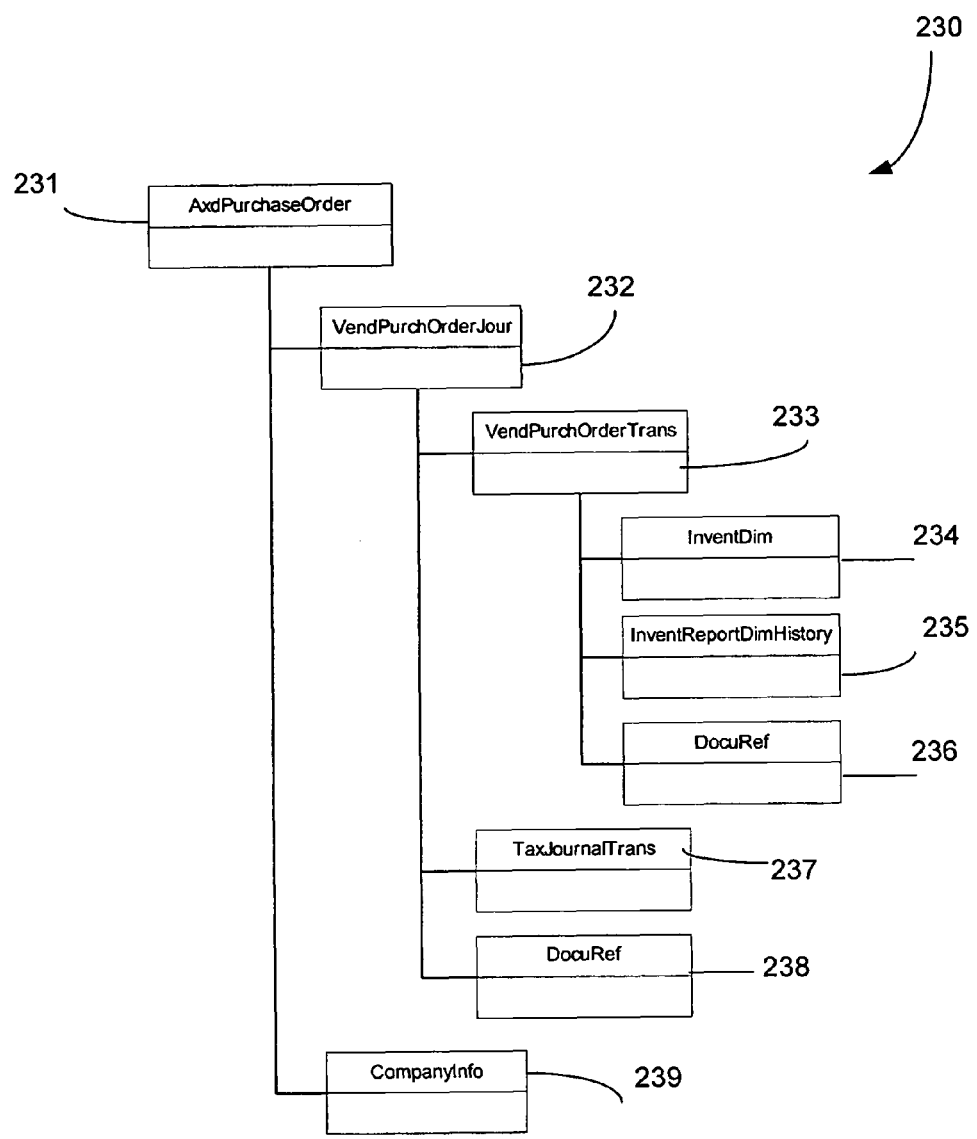
FIG. 4A illustrates an exemplary query structure representing an XML document of the data exchange system.

For example, an SQL query 230 representing the structure of a purchase order is illustrated in FIG. 4A. The query 230 refers to various tables 231-239. Using the query 230, the schema module 220 may generate an XML schema 245 illustrated in FIG. 4B. As shown in FIG. 4B, each of the various tables 231-239 are represented by table elements. Nested within each of the table elements are the property elements containing all the elements of either the corresponding tables from the data tables 206 or the corresponding internal classes 208, when such an internal class exists. Furthermore, following the property element of each of the tables 231-239 may be a series of child elements representing the children of that particular table as defined in the query 230. Note that, if a table in the query 230 has no children, it may only contain a property element.

Moreover, the data exchange system 200 may also include a programmable entity module 218 that allows a user to create data processing and business logic classes in an object oriented programming that are specific to a business process used by the application 202. Finally, the data exchange system 200 may also include an interface module 222 that interacts with the database 204 and the application 202, as well as communicates with various modules within the data exchange system 200. Furthermore, the data exchange system 200 may also allow restricting the amount XML data exchanged between the application 202 and the data tables 206 by modifying at least one of the query structures 210, the programmable entity module 218 and a data filter, where the data filter may also be stored in the memory component of the data exchange system 200.

Figure 5:
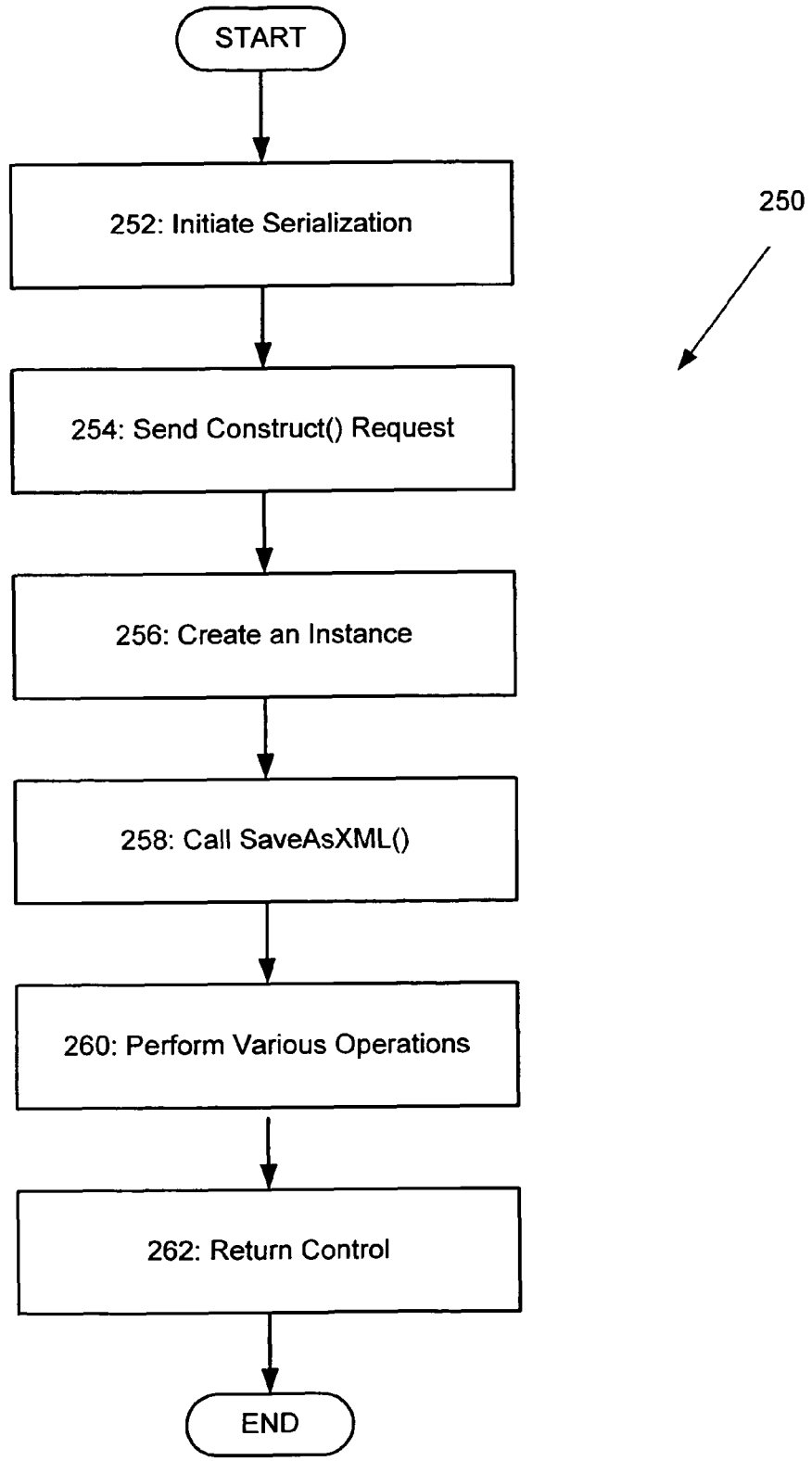
FIG. 5 illustrates an exemplary flowchart illustrating processing of a request to generate an XML document based on data queried from one or more tables.

The functioning of the data exchange system 200 and its various components is explained below in further detail in FIGS. 5-7. Specifically, FIG. 5 illustrates a flowchart of an exemplary serialization program 250 that may be implemented by the serialization module 212 for sending a document to an application, such as the application 202. At a block 252, the serialization program 250 may be initiated in response to a read( ) request received by the interface module 222, in response to a send( )request generated in the data exchange system 200 based on some business logic, etc, to generate a desired document from the data exchange system 200.

At a block 254 the interface module 222 sends a construct( ) request to the document classes 212 to create a specific instance of a specific document class that corresponds to the desired document. To identify the specific document to be retrieved, the construct( ) request may include an actionId as a parameter that identifies the class of the desired document to be instantiated. For example, a document class generator may receive the contrusct( ) request with Purchase-Order as the actionId to generate an instance of a purchase order document.

In response, at a block 256, the serialization module 214 may create an instance of the specific document class identified by the actionId, and then execute a particular query associated with the document class to retrieve data from database tables 206, where such a particular query may be retrieved from the query structures 210. Subsequently, the serialization module 214 may create corresponding internal class objects for each of the database tables identified in the particular query and provide the internal class objects with the retrieved data. At a block 258, the serialization module 214 may call a saveAsXML( ) request on the document classes 212 to serialize the retrieved data into an XML document that corresponds to the particular query. The serialization module 212 may supply various parameters with the saveAsXML( ) request, as listed below.

keyFields: A container with the unique keys that identify a database record to fetch from a "root" table of the document through the internal classes 208.
filename: Name and location of the file that the output XML document should be written to.
filterXSD: File name and location of the XSD schema to read and use for filtering.
gatewayDocSetup: Record from the GatewayDocSetup table identifying the value mapping to be performed.
docPurpose: Specifies whether the document is an original, a duplicate or a pro forma.

In response to the saveAsXML( ) request, at a block 260 the document classes 212 may perform the following operations:

(1) document level properties of the document class instances may be populated with the information about the document type, as supplied by the docPurpose parameter;

(2) selecting the data in the database 204 to be serialized into an XML document using keyFields parameter as the primary key;

(3) the document classes 212 may perform a lifecycle check on the desired document to ensure that it is valid to create the desired document;

(4) the document classes 212 may read the XML schema from thefilterXSD file to be used for filtering;

(5) the document classes may filter out any property from the relevant internal classes 208 for which there is no corresponding element in the XML schema used for filtering;

(6) depending on the settings in the gatewayDocSetup record, values of certain properties may be substituted for external codes; and (7) each internal class 208 and document class 210 related to the desired document may be serialized and an output file may be written to file identified by filename.

Finally, a block 262 may return control back to the interface module 222. Note that not all the steps of the serialization program 250 may be necessary in an alternate implementation. For example, in an alternate implementation, the serialization program 250 may not include the block 260 performing various operations described above.

Figure 6:
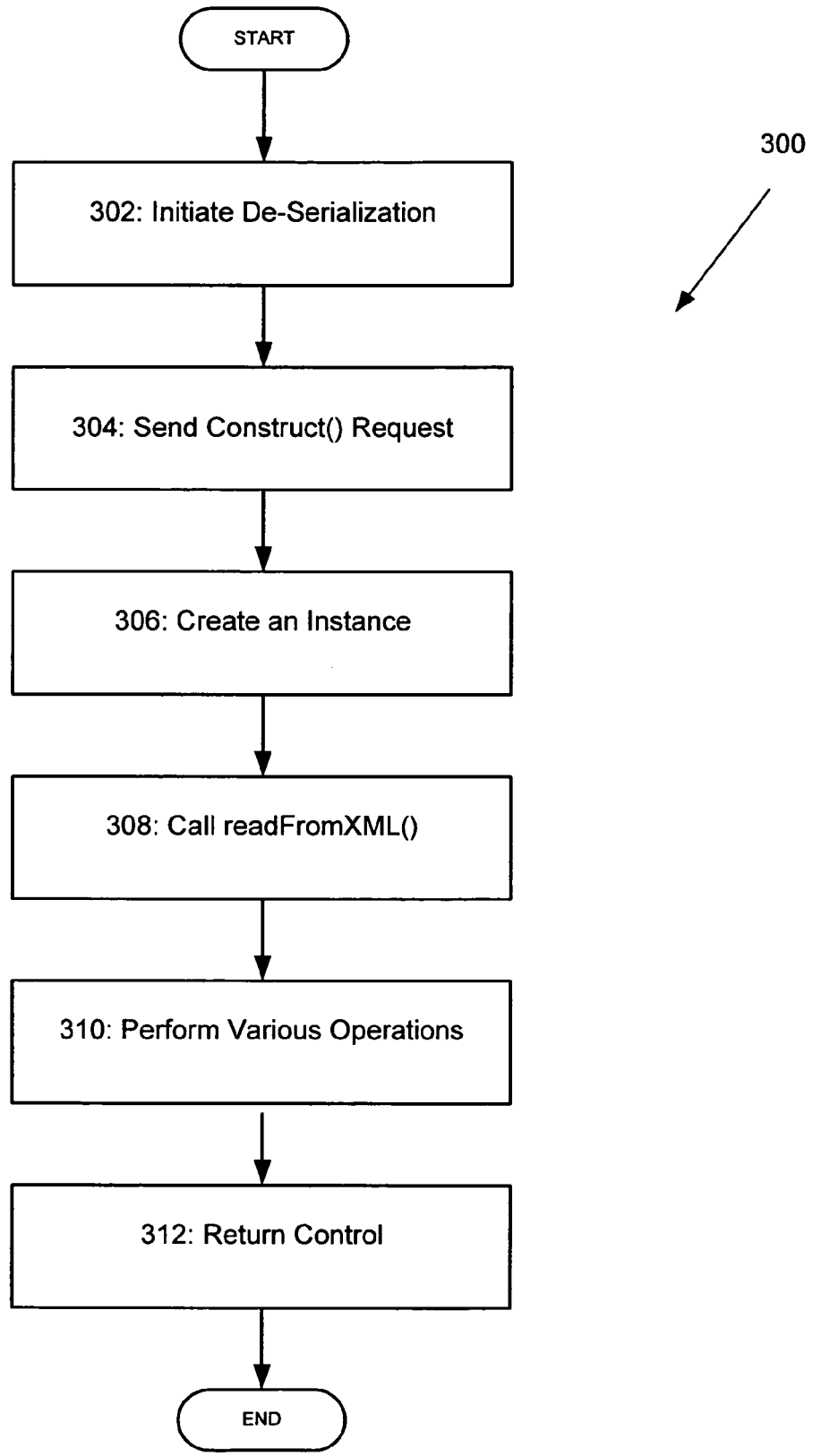
FIG. 6 illustrates an exemplary flowchart illustrating processing of a request to write data to one or more tables from an XML document.

FIG. 6 illustrates a flowchart of a de-serialization program 300 that may be implemented by the de-serialization module 216 for processing an inbound XML document and to store data received form the inbound XML document into the data tables 206. At a block 302, the de-serialization program 300 may be initiated in response to receiving an XML document from a web service connected to the interface module 222.

In response to receiving the XML document, a block 304 calls a constructs request on the document classes 212 to create an instance of the specific document class that corresponds to the received XML document. To identify the class of the specific document received, the construct( ) request may include an actionId as a parameter that identifies the class of the received document.

In response, at a block 306, the de-serialization module may create an instance of the specific document class identified by the actionId.

Subsequently, at a block 308, the de-serialization module 214 may call a readFromXML( ) request on the document classes 212 to de-serialize the received XML document and to save it in the database 204. The de-serialization module 214 may supply various parameters with the readFromXML( ) request, as listed below.

filename: Name and location of the file that the output XML document should read from.
docType: Specifies how the document should be created in the database.
gatewayDocSetup: Record from the GatewayDocSetup table identifying the value mapping to be performed.

In response to the readFromXML( ) request, at a block 310 the document classes 212 may perform the following operations:

(1) De-serialize the received document into the corresponding internal class 208, i.e. populate the properties of the internal class 208 corresponding from the corresponding data elements in the received XML document;

(2) set the value of the <documents type> property of the received document to docType;

(3) depending on the value of the gatewayDocSetup parameter, map values of certain properties of the received document to corresponding internal codes;

(4) before persisting an internal class 208 to the database 206, validate that business rules associated with that internal class are validated;

(5) validate that any business rule governing processing of a document class 210 are honored; and (6) persist the received document to the database 206 by invoking save( ) method on each internal class 208 and document class 210 related to the received document.

Finally, a block 312 may return control back to the interface module 222. Note that not all the steps of the de-serialization program 300 may be necessary in an alternate implementation. For example, in an alternate implementation, the de-serialization program 300 may not include the block 310 performing various operations described above.

FIG. 7 illustrates a flowchart of a schema generation program 350 that may be implemented by the schema module 218 for generating an XML schema, wherein an SQL query structure defines the structure of an XML document. To ensure that XML documents exchanged through the interface module 222 match the class structure of documents used by the data exchange system 200, the document classes 212 can self-generate the XML schema for the XML documents that correspond to associated query structures. At a block 352, the schema generation program 350 may be initiated in response to receiving a request from the interface module 222 for generating an XSD schema for a desired XML document, wherein the interface module 222 may have received such a request from an administrator.

A block 354 calls a construct( ) request on the document classes 212 to create an instance of the specific document class that corresponds to the desired XML document for which an XML schema needs to be generated. To identify the class of the specific document desired, the construct( ) request may include an actionId as a parameter that identifies the class of the received document.

In response, at a block 356, the schema module 218 may create an instance of the specific document class identified by the actionId.

Subsequently, at a block 358, the schema module 218 may invoke a saveXSDschema( ) request on the document classes 212 to generate the XML schema. The de-serialization module 214 may supply a filename parameter with the saveXSDschema( ) request, wherein the filename specifies the name and location of the XML schema file to be generated.

In response to the saveXSDschema( ) request, at a block 360 the document classes 212 may perform the following operations:

(1) save a back-up copy of an existing XML schema located in fileName;

(2) traverse a query structure 210 of a corresponding document class 212 and generate the corresponding XML schema fragment for each corresponding internal class 208 or for each corresponding data table 206 if there is no corresponding internal class 208;

(3) write the generated XML schema to the file whose name/path is passed as a parameter to the saveXSDschema( ) request; and (4) delete the back-up copy of the old XML schema;

Finally, a block 360 may return control back to the interface module 222. Note that not all the steps of the schema generation program 350 may be necessary in an alternate implementation. For example, in an alternate implementation, the schema generation program 350 may not include the block 360 performing various operations described above.

While each of the programs 250, 300 and 350 illustrates only one example of its respective functioning, as one of ordinary skill in the art would appreciate, other variations may also occur based on the circumstances of each individual operation, values passed by the parameters, etc.

A person of ordinary skill in the art would appreciate the advantages of using the data exchange system 200 for exchanging data between the database 204 and an application 202 allows generating XML documents using data from the data tables 206 without requiring a user to know any business logic governing the retrieval of data from the various data tables 206. Similarly, the data exchange system 200 also allows an application 202 to send an XML document containing various data that needs to be stored in the database 204 without requiring a user of the application 202 to know any business logic governing update of the various data tables 206.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method for exchanging data from an Enterprise Resource Program or Customer Relationship Management application between a database table and an XML document wherein the database table is a relational database table and the query structure is an SQL query structure and wherein the database table is represented in the form of an internal class, the method comprising:

defining a query structure providing:
(1) a data structure of the XML document;
(2) a data storage strategy for de-serializing the XML document to the database table; and
(3) a data retrieval strategy for serializing the XML document from the database table;

defining a programmable entity including:
(1) business logic specific to a business process;
(2) a data storage strategy specific to the business process and
(3) a data retrieval strategy specific to the business process;

de-serializing the XML document to the database table using the programmable entity and using the query structure including validating a business rule associated with a document class corresponding to the XML;

comprising
initiating in response to receiving an XML document;
calling a constructs request on document classes to create an instance of the specific document class that corresponds to the received XML document;
creating an instance of the specific document class;
calling a readFromXML( )request on the document classes to de-serialize the received XML document and to save it in the database including:
a filename that indicate a name and location of the file that the output XML document should read from,
a docType that specifies how the document should be created in the database,
a gatewayDocSetup that records from the GatewayDocSetup a table identifying the value mapping to be performed;
de-serializing the received XML document into a corresponding internal class;
setting a value of the <documents type>property of the received XML document to docType;
persisting the received XML document to the database by invoking save( ) method on each internal class and document class related to the received XML document;

serializing data from the database table to the XML document using the programmable entity and using the query structure including performing a lifecycle check on the XML document wherein the lifecycle check determines if the XML document respects lifecycle rules related to the XML document; comprising:
creating an instance of the specific document class identified by an actionId,
executing a particular query associated with the document class to retrieve data from database tables;
creating corresponding internal class objects for each of the database tables identified in the particular query and providing the internal class objects with the retrieved data;
calling a saveAsXML( )request on the document classes to serialize the retrieved data into an XML document that corresponds to the particular query, including:

keyFields which comprise a container with the unique keys that identify a database record to fetch from a "root" table of the document through the internal classes:

filename that comprises a name and location of the file that the output XML document should be written to;

filterXSD that comprises a file name and location of the XSD schema to read and use for filtering;

gatewayDocSetup that comprises a record from the GatewayDocSetup table identifying a value mapping to be performed;

docPurpose that comprises information that specifies whether the document is an original, a duplicate or a pro forma;

populating document level properties of the document class instances with the information about the document type, as supplied by the docPurpose parameter;

selecting the data in the database to be serialized into an XML document using keyFields parameter as the primary key;

reading the XML schema from thefilterXSD file to be used for filtering;

filtering out any property from the relevant internal classes for which there is no corresponding element in the XML schema used for filtering;

serializing each internal class and document class related to the desired document and an writing an output file to a file identified by filename;

generating an XML schema based on:
(1) the document class,
(2) the database table; and
(3) the query structure and
(4) the programmable entity comprising
calling a construct( )request on the document classes to create an instance of the specific document class that corresponds to the desired XML document for which an XML schema needs to be generated;

identifying the class of the specific document desired by including an actionId as a parameter that identifies the class of the received document;

creating an instance of the specific document class identified by the actionId;

invoking a saveXSDschema( )request on the document classes to generate the XML schema;

supplying a filename parameter with the saveXSDschema( )request, wherein the filename specifies the name and location of the XML schema file to be generated;

saving a back-up copy of an existing XML schema located in fileName;

traversing a query structure of a corresponding document class and generate the corresponding XML schema fragment for each corresponding internal class or for each corresponding data table if there is no corresponding internal class;

writing the generated XML schema to the file whose name/path is passed as a parameter to the saveXSDschema( )request; and deleting the back-up copy of the old XML schema.

2. A method of claim 1, further comprising restricting the amount of XML data exchange by modifying at least one of: (1) the query structure; (2) the programmable entity; and (3) a data filter.

* * * * *